(No Model.)
J. K. BROWN.
RIBBED GLASS FUNNEL AND MOLD THEREFOR.
No. 300,691. Patented June 17, 1884.
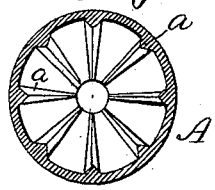
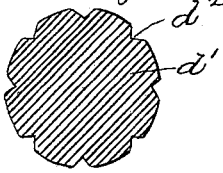
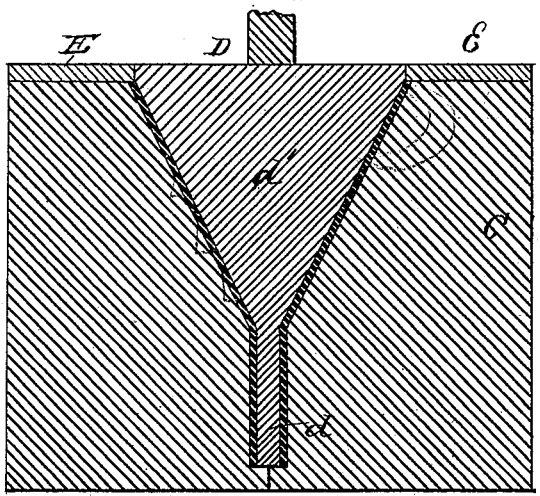
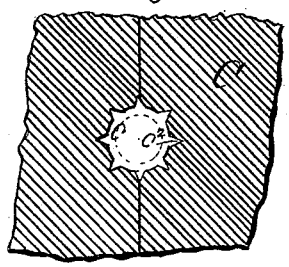
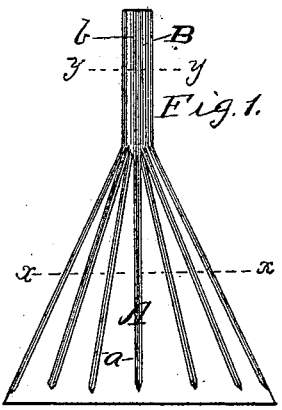
Witnesses:
H. E. Bliss
N. Carroll Downs.
Inventor:
Joseph K Brown
by Doubleday & Bliss
attys

United States Patent Office.

JOSEPH K. BROWN, OF CANTON, OHIO.

RIBBED GLASS FUNNEL AND MOLD THEREFOR.

SPECIFICATION forming part of Letters Patent No. 300,691, dated June 17, 1884.

Application filed February 14, 1884. (No model.)

*To all whom it may concern:*

Be it known that I, JOSEPH K. BROWN, a citizen of the United States, residing at Canton, in the county of Stark and State of Ohio, have invented certain new and useful Improvements in Ribbed Glass Funnels and Molds therefor, of which the following is a specification, reference being had therein to the accompanying drawings.

Figure 1 is an elevation of my improved glass funnel. Fig. 2 is a section on the line $x\,x$, Fig. 1. Fig. 3 is a section on the line $y\,y$, Fig. 1. Fig. 4 is a section of the mold used in forming the funnel. Figs. 5 and 6 are sectional views of the plunger. Fig. 7 is a section of a portion of the mold, showing the part which forms the stem of the funnel.

In the drawings, A represents the bell portion of the funnel, and B the stem thereof. The general shape of these parts forms no feature of my invention, and may be varied to suit the different purposes for which the funnel is used—as, for instance, I may make the bell part of the funnel polygonal in cross-section, instead of round, as shown.

$a\,a$ are ribs formed upon the inside of the bell of the funnel, converging toward the opening into the stem B, and $b$ are ribs or corrugations upon the outside of the stem B. The ribs $a$ operate, when the funnel is used for filtering purposes, to prevent the filtering-paper from adhering closely to the sides of the glass, and thus preventing the flow of the liquid downward, while the ribs $b$ leave a series of vents for the escape of the air from the vessel into which the funnel is inserted.

I am aware that glass funnels have been known having ribs upon their inner faces; but as heretofore made they have been more or less imperfect, and the process of manufacture has been slow and expensive, the ribs having to be put on by hand. To overcome these disadvantages, I have devised a mold adapted to form a funnel of the character described, whereby I form a more perfect funnel and at a less cost than by the old method.

In Fig. 4 is shown a two-part mold, C, the cavity therein conforming in shape to the outside of the funnel to be produced. The small tapering part $c$ of the cavity, in which the stem of the funnel is formed, is grooved or fluted, as at $c^2$, to form the external ribs, $b$, on the neck of the funnel.

D is the plunger, and E the usual ring-plate. The stem-part $d$ of the plunger, which acts as the core for the neck B, is plain and smooth, while the larger conical-shaped portion $d'$ is grooved, as at $d^2$, whereby the ribs $a$ on the interior of the funnel are formed.

While I always prefer to form the ribs upon funnels used for filtering purposes, yet there are many uses to which a glass funnel is especially adapted wherein the ribs may be dispensed with. In such case all parts of the mold and plunger are made smooth.

Instead of forming ribs upon the funnel, I may provide the parts with grooves in place of the ribs, which will necessitate a change in mold, as will be readily understood.

What I claim is—

1. A glass mold, C, having the narrow tapering fluted or grooved part $c$ and the larger flaring part $c'$, in combination with a plunger, D, having a stem, $d$, and a larger cone-shaped portion, $d'$, said parts being adapted to form a glass funnel having an externally-ribbed neck or stem, substantially as set forth.

2. A glass mold, C, having the narrow tapering part $c$ and the larger flaring part $c'$, in combination with a plunger, D, having the stem $d$, and the larger cone-shaped part $d'$, having grooves $d^2$ in its face, these parts being adapted to form a glass funnel having a series of internal ribs upon its bell portion, substantially as set forth.

3. A glass mold, C, having the narrow tapering fluted or grooved part $c$ and the larger flaring part $c'$, in combination with a plunger, D, having the stem $d$, and the larger cone-shaped part $d'$, provided with grooves $d^2$, these parts being adapted to produce a glass funnel having an externally-ribbed stem and an internally-ribbed bell portion, substantially as set forth.

4. A glass funnel having the neck or stem B provided with a series of external ribs or grooves, substantially as set forth.

5. A glass funnel having the stem B provided with a series of external grooves or ribs, and the bell portion A provided upon its inner face with ribs $a$, substantially as set forth.

In testimony whereof I affix my signature in presence of two witnesses.

JOSEPH K. BROWN.

Witnesses:
JAMES J. CLARK,
C. H. VAN HORN.